United States Patent
Scherer

(10) Patent No.: US 7,855,337 B2
(45) Date of Patent: Dec. 21, 2010

(54) ELECTRICAL SYSTEMS, FACILITIES, AND METHODS WITH POWER PEDESTALS HAVING EUFER GROUNDING

(75) Inventor: John Scherer, Jacksonville, FL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 483 days.

(21) Appl. No.: 11/862,548

(22) Filed: Sep. 27, 2007

(65) Prior Publication Data

US 2009/0084569 A1 Apr. 2, 2009

(51) Int. Cl.
*H01R 4/66* (2006.01)

(52) U.S. Cl. ............... 174/6; 174/2; 174/7; 174/51; 174/5 R; 361/689; 439/98

(58) Field of Classification Search .............. 174/2, 174/5 SG, 5 R, 6, 7, 32, 37–39, 51; 29/825; 361/689, 672, 799; 248/551; 439/98, 100
See application file for complete search history.

(56) References Cited

U.S. PATENT DOCUMENTS 6,177,630 B1 * 1/2001 Stensgaard ............ 174/2

OTHER PUBLICATIONS

JuiceBox Power Transfer Switch, Emerson Network Power, 2006.
Eufer Grounding, National Electrical Code section 250.50, Dec. 6, 2005.
Guidelines for Wiring Single Family Dwelling Units, Pikes Peak Regional Building Department, date unknown.
Building Department Schedule & Checklist of Inspections, date unknown.

* cited by examiner

*Primary Examiner*—Dhiru R Patel
(74) *Attorney, Agent, or Firm*—Scott P. Zimmerman PLLC

(57) ABSTRACT

Power pedestals are provided with an electrical ground connection to rebar encased in a foundation slab of a facility to thereby establish a EUFER ground for the power pedestal. Many pieces of rebar may be present within the foundation slab and may be interconnected to form a rebar network. In addition to the EUFER ground provided by the rebar, other grounding techniques may also be included such as a ground ring formed by ground rods spaced around the foundation slab and interconnected by a buried conductor that encircles the foundation slab. The rebar may be electrically connected to the ground ring to establish the conductivity to the earth. The power pedestal and EUFER ground may be present at various facilities, such as those including outdoor electronics equipment closures such as remote terminals and base stations.

20 Claims, 4 Drawing Sheets

ELECTRICAL SYSTEMS, FACILITIES, AND METHODS WITH POWER PEDESTALS HAVING EUFER GROUNDING

TECHNICAL FIELD

Embodiments relate to the grounding of electrical systems of facilities that utilize power pedestals to receive utility power. More particularly, embodiments relate to using a EUFER (also known as UFER) ground in conjunction with the power pedestal at a facility.

BACKGROUND

Certain facilities utilize power pedestals that are located on the exterior of the facility to receive electrical power from a public utility. In most cases, the facility is an outdoor electronic equipment closure. Examples of such outdoor electronic equipment enclosures include remote terminals of a public switched telephone network, remote nodes of a cable television distribution network, and base stations of mobile communications networks.

In many cases, particularly with outdoor electronic equipment closures, the interior of the facility is filled with electronic equipment. In the case of a remote terminal, for instance, the facility may be filled with dial tone equipment such as cross-connects and the like, with multiplexers, and with digital subscriber line (DSL) equipment such as DSL modems. The interior of the facility may have little space for circuit breaker panels and electrical service boxes. Power pedestals are installed outside of the facility to provide the electrical service box that includes the circuit breaker panels and other related power features.

The electrical system of such a facility must be grounded for safety reasons. The ground provides a degree of security by providing stray current a path other than through sensitive equipment or personnel. Furthermore, the ground may provide some degree of protection from nearby lightning strikes by channeling static electricity to ground and away from the facility.

With power pedestals, the ground is provided by having one or more ground rods driven into the ground at various locations around the facility. A ground ring may then be formed by using an electrical conductor that is buried and that encircles the facility to electrically connect each of the ground rods back to the ground terminal of the power pedestal. While such a ground may provide some degree of safety, the resistance of the ground for the power pedestal may still be relatively high such that an undesirable level of stray current may travel through other undesired paths and such that static electricity may not be adequately dissipated.

SUMMARY

Embodiments address issues such as these and others by providing a EUFER ground in conjunction with a power pedestal. The power pedestal continues to offer the convenience of outdoor installation while the EUFER ground may increase the effectiveness of the electrical ground of the power pedestal and the corresponding facility.

Embodiments provide an electrical system that includes a foundation slab disposed on a ground surface. A power pedestal positioned aside the foundation slab receives electrical power from a public utility, and the power pedestal includes an electrical ground. At least one piece of electrically conductive rebar is encased within the foundation slab, and at least a first portion of the electrically conductive rebar is exposed from the foundation slab and is electrically connected to the electrical ground of the power pedestal.

Embodiments provide a method of providing an electrical ground that involves receiving electrical power at a power pedestal aside a foundation slab situated on a ground surface. The foundation slab encases at least one piece of electrically conductive rebar with at least a first portion of the at least one piece of electrically conductive rebar being exposed from the foundation slab. The method further involves electrically grounding the power pedestal by interconnecting an electrical ground of the power pedestal to the first portion of the electrically conductive rebar.

Embodiments provide an electrical device facility that includes a foundation slab, a roof, and outer walls supporting the roof and resting on the foundation slab. The electrical device facility further includes electrical devices within a structure created by the roof, outer walls and foundation slab. A power pedestal is positioned aside the foundation slab, and the power pedestal receives electrical power from a public utility and provides the electrical power and an electrical ground to the electrical devices. At least one piece of electrically conductive rebar is encased within the foundation slab and has at least a first portion exposed from the foundation slab. The first portion is electrically connected to the electrical ground of the power pedestal.

Other systems and/or methods according to embodiments will be or become apparent to one with skill in the art upon review of the following drawings and detailed description. It is intended that all such additional systems and/or methods be included within this description, be within the scope of the present invention, and be protected by the accompanying claims.

DETAILED DESCRIPTION

Embodiments provide for power pedestals and corresponding facilities that have a EUFER electrical ground. The EUFER electrical ground may be in addition to other grounding features such as ground rings that include one or more conductors and ground rods.

Figure 1:
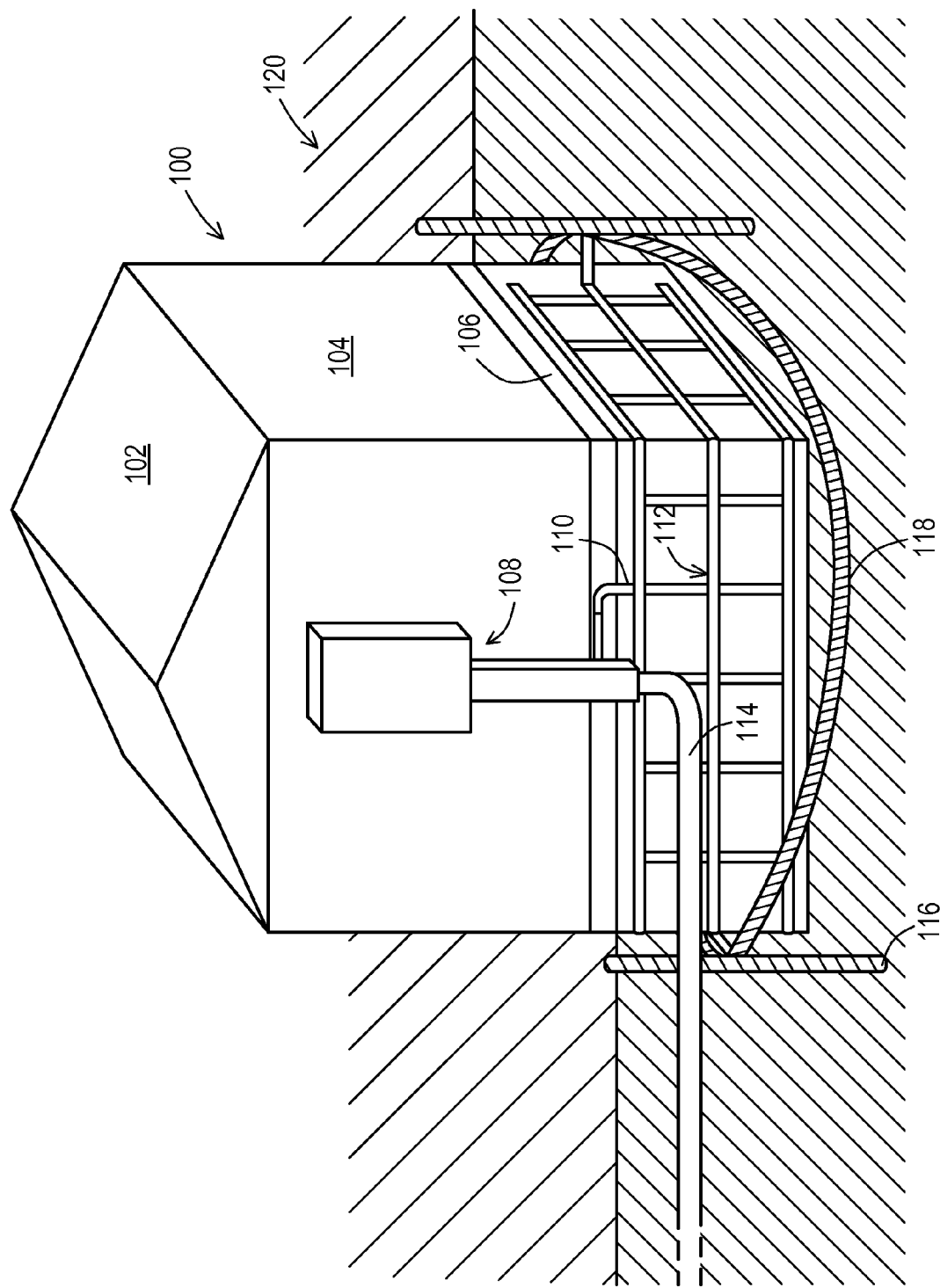
FIG. 1 shows a plan view of one example of a facility that includes a power pedestal and a EUFER ground according to various embodiments.
Figure 1B:
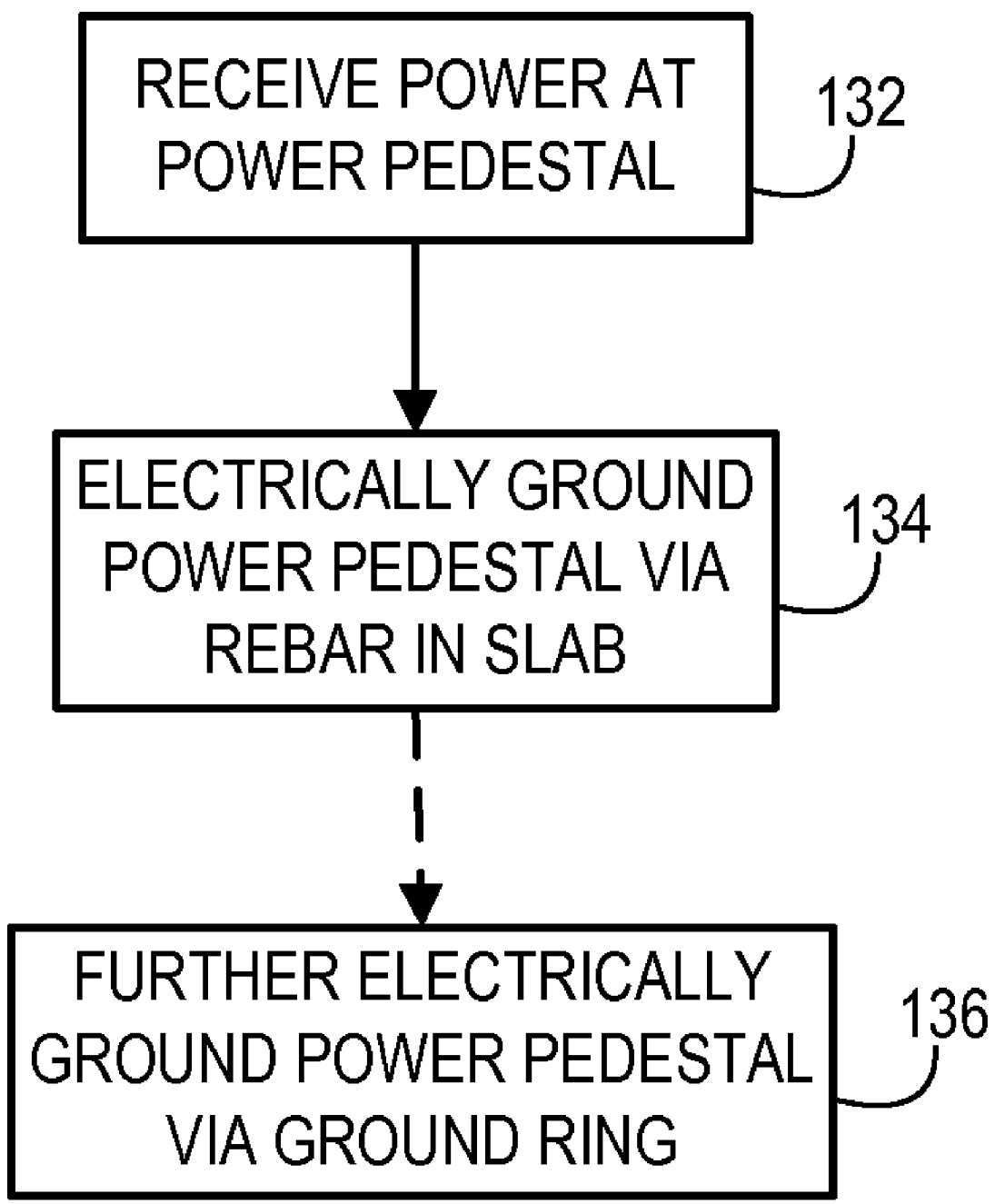
FIG. 1B shows a set of operations established by the EUFER ground.

As shown in FIG. 1, a facility such as an outdoor electronic equipment closure 100 includes a power pedestal 108 for receiving power from a public utility as in a power operation 132 of FIG. 1B. The facility includes walls 104 and a roof 102 that together form a structure. While the facility 100 has a relatively large coverage area and a sloped roof, it will be appreciated that the facility 100 may range from a standard building on the large end to a box-type equipment enclosure on the small end.

Regardless of the size of the facility, a foundation slab 106 is formed onto a ground 120 and serves as the foundation of the facility 100, according to exemplary embodiments. The structure formed by the walls 104 and roof 102 rest upon the foundation slab 106. The foundation slab 106 may encase one or more pieces of rebar 110, which may be made of steel or other rigid conductors and may be any of the various shapes and sizes that are available. In this particular example, several pieces of the rebar 110 are tied, welded, or otherwise held together to form a rebar network 112. The rebar network 112 provides support for the foundation slab. As discussed below, the rebar network 112 also provides additional conduction pathways to the ground 120 as each individual piece of the rebar 110 is an electrical conductor.

As shown, the power pedestal 108 may be pole mounted. It will be appreciated that the power pedestal 108 may be mounted in a variety of manners, including pole mounting as shown or direct mounting to the wall 104 of the facility. Regardless of mounting configuration, the power pedestal 108 provides utility power to the interior circuitry of the facility and provides the electrical ground connection to the rebar 110, in accordance with exemplary embodiments.

In this example, the power pedestal 108 is receiving power via an underground power supply line 114. However, it will be appreciated that the power pedestal 108 may additionally or alternatively receive power via an aboveground supply line. The power pedestal 108 has a ground connection that is electrically connected to a piece of the rebar 110 that is exposed from the foundation slab 106. The exposed piece 110 may protrude above the ground 120 for connection to a ground conductor of the power pedestal 108 or may be connected via an underground connection point.

The electrical connection of the ground terminal of the power pedestal 108 to the rebar 110 which is part of the rebar network 112 forms a EUFER ground as in a grounding operation 134 of FIG. 1B. There is a significant mass of electrical conductors within the rebar network 112, and this mass in combination with the relatively large surface area of the foundation slab 106 that is in contact with the soil results in a relatively low resistance pathway for stray electrical current to follow. The rebar network 112 is in electrical connectivity with an electrical conductor that is within the ground 120, in the range of ten feet deep depending upon the location, in order to establish the electrical ground, according to exemplary embodiments.

In the example shown, the EUFER ground establishes its pathway to earth via the conductive abilities of the foundation slab 106. This foundation slab 106 may be constructed of concrete or other slab materials that have a suitable conductivity. The large amount of surface area of the slab material that is in contact with the surrounding soil coupled with the conductive qualities of the slab material result in the electrical grounding qualities. In this example, an additional pathway to earth is provided via the electrical connection to a ground ring as in a second grounding operation 136 of FIG. 1B. The ground ring may include several ground rods 116 spaced around the foundation slab 106 and a conductive line 118, for example a copper line, which encircles the foundation slab 106 and electrically interconnects the ground rods 116.

Figure 2:
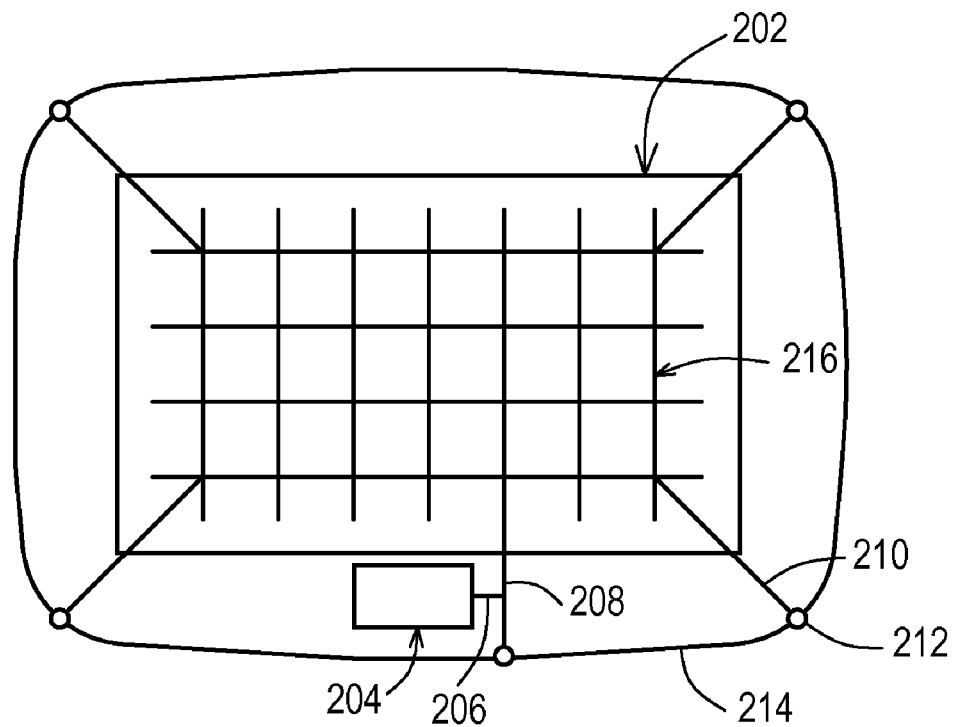
FIG. 2 shows a top view of one example of a EUFER ground in conjunction with a ground ring according to various embodiments.

FIG. 2 shows a top view of a foundation slab 202 of a facility such as the facility 100 shown in FIG. 1. A power pedestal 204 is positioned alongside the foundation slab 202. According to exemplary embodiments, the power pedestal 204 includes a ground conductor 206 that is electrically connected to an exposed piece of rebar 208 extending from the slab 202. In this example, the ground conductor 206 and the rebar 208 are also electrically connected to a ground ring conductor 214 that encircles the foundation slab 202. The ground ring conductor 214 also electrically connects to various ground rods 212 spaced about the periphery of the foundation slab 202.

Within the foundation slab 202, a network of rebar 216 may be included to provide the conductive mass for the electrical ground. Additionally, pieces of rebar 210 may protrude from the rebar network 216 within the foundation slab 202 and connect to the ground ring such as by being directly connected to one of the ground rods 212.

Figure 3:
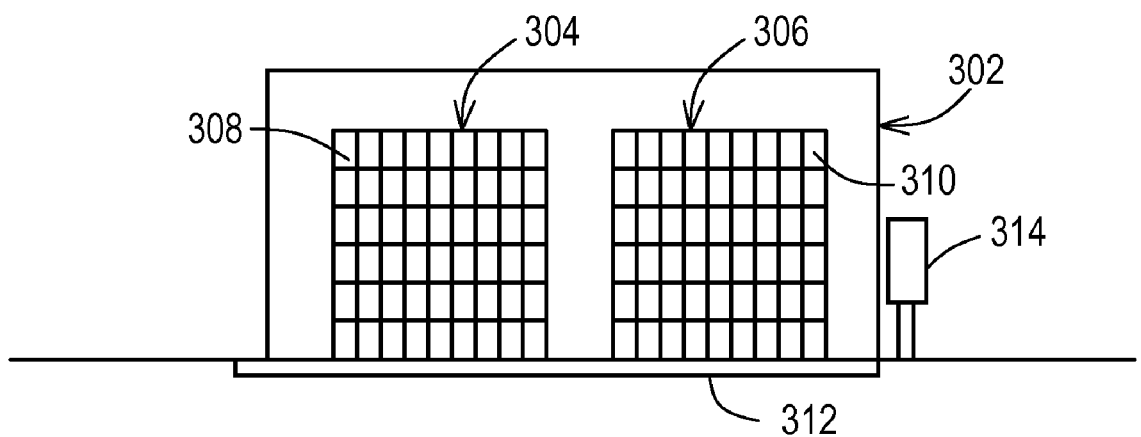
FIG. 3 shows a plan view of the interior of an illustrative facility.

FIG. 3 shows a front view of an open outdoor electronic equipment closure facility 302. A power pedestal 314 is located alongside the facility 302. The facility 302 rests upon a foundation slab 312 that provides rebar to establish the electrical ground for the power pedestal 314.

Within the facility, two racks 304, 306 of equipment are shown. These racks 304, 306 may include individual electronic devices 308, 310. For example, the rack 304 may be a dial tone equipment rack, such as a cross-connect, where each of the individual electronic devices 308 provides a port to a particular twisted pair of telephone line. As another example, the rack 306 may be a DSL equipment rack, where each of the individual electronic devices 310 may correspond to a provider-side DSL modem. It will be appreciated that the facility having a power pedestal with a EUFER ground may be any number of facility types and are not limited to outdoor electronic equipment closures.

Figure 4:
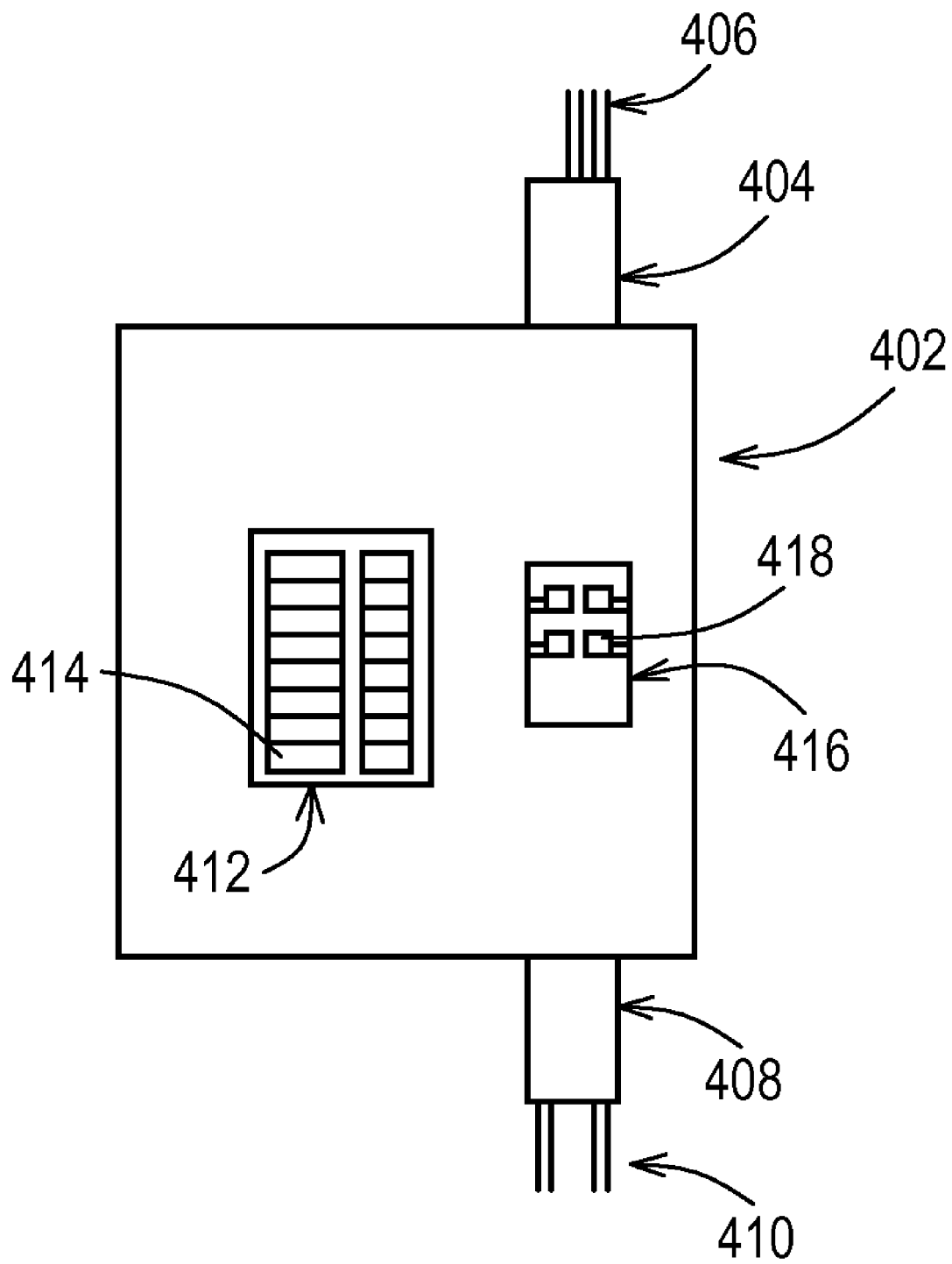
FIG. 4 shows a front view of an interior of an illustrative power pedestal.

FIG. 4 shows an example of a power pedestal 402. According to exemplary embodiments, the power pedestal 402 has one or more power conductor inlets 404, 408 where power conductors 406, 410 may enter the power pedestal. For example, the incoming power from a utility may be present on the conductors 406 while the conductors 410 include at least one ground terminal conductor that leads to the connection to the EUFER ground.

This power pedestal 402 also includes a circuit breaker panel 412 that includes individual circuit breakers 414 for each of the individual power circuits being provided to a facility. The power pedestal 402 may also include a set of alarm circuits 416 where individual fuses 418 are present for each alarm circuit that is present to monitor for conditions of circuits.

Power pedestals, such as the power pedestal 402, are readily available. The JUICEBOX® power transfer switch by Emerson Network Power Energy Systems of Warrenville, Ill., a division of Emerson Electric Co., is one example. The JUICEBOX® power transfer switch is often used for outdoor electronic equipment closure facilities.

Thus, as described above, embodiments provide a EUFER ground in conjunction with a power pedestal at a facility. The facility may rely on the EUFER ground alone or in combination with other ground techniques including ground rings. As such, the facility may benefit from the conductive mass of the EUFER ground.

While embodiments have been particularly shown and described, it will be understood by those skilled in the art that various other changes in the form and details may be made therein without departing from the spirit and scope of the invention.

What is claimed is:

1. An electrical system, comprising:
    a foundation slab disposed on a ground surface;
    a power pedestal aside the foundation slab, the power pedestal receiving electrical power and an electrical ground; and
    at least one piece of electrically conductive rebar encased within the foundation slab, at least a first portion of the electrically conductive rebar being exposed from the foundation slab and being electrically connected to the electrical ground of the power pedestal.

2. The electrical system of claim 1, wherein the at least one piece of electrically conductive rebar comprises a network of electrically conductive pieces of rebar encased within the foundation slab.

3. The electrical system of claim 1, further comprising a plurality of ground rods positioned into the ground surface at spaced positions surrounding the foundation slab and a conductor surrounding the foundation slab and electrically interconnecting each of the ground rods and being electrically connected to the rebar exposed from the slab.

4. The electrical system of claim 3, further comprising a plurality of electrical devices situated within a facility that is resting on the foundation slab, the plurality of electrical devices receiving electrical power from the power pedestal and being grounded by the electrical ground of the power pedestal.

5. The electrical system of claim 4, wherein the electrical devices comprise dial tone equipment.

6. The electrical system of claim 4, wherein the electrical devices comprise digital subscriber line equipment.

7. The electrical system of claim 1, further comprising a plurality of electrical devices situated within a facility that is resting on the foundation slab, the plurality of electrical devices receiving electrical power from the power pedestal and being electrically grounded by the electrical ground of the power pedestal.

8. The electrical system of claim 7, wherein the electrical devices comprise dial tone equipment.

9. The electrical system of claim 7, wherein the electrical devices comprise digital subscriber line equipment.

10. A method of providing an electrical ground, comprising:
   receiving electrical power at a power pedestal aside a foundation slab situated on the earth, the foundation slab encasing at least one piece of electrically conductive rebar with at least a first portion of the at least one piece of electrically conductive rebar being exposed above the earth from the foundation slab; and
   electrically grounding the power pedestal by interconnecting an electrical ground of the power pedestal to the first portion of the electrically conductive rebar.

11. The method of claim 10, further comprising electrically grounding the power pedestal by interconnecting the electrical ground of the power pedestal to a conductor that surrounds the foundation slab and that electrically interconnects a plurality of ground rods that are positioned at locations surrounding the foundation slab and that are disposed within the earth.

12. The method of claim 11, wherein the at least one piece of electrically conductive rebar comprises a network of electrically conductive rebar with a plurality of portions exposed from the foundation slab, the method further comprising electrically grounding the power pedestal by interconnecting the plurality of portions of the electrically conductive rebar to the plurality of ground rods.

13. An electrical device facility, comprising:
   a foundation slab;
   a roof;
   outer walls supporting the roof and resting on the foundation slab;
   electrical devices within a structure created by the roof, outer walls and foundation slab;
   a power pedestal aside the foundation slab, the power pedestal receiving electrical power and providing the electrical power and an electrical ground to the electrical devices; and
   at least one piece of electrically conductive rebar encased within the foundation slab and having at least a first portion exposed from the foundation slab, the first portion being electrically connected to the electrical ground of the power pedestal.

14. The electrical device facility of claim 13, wherein the at least one piece of electrically conductive rebar comprises a network of electrically conductive pieces of rebar encased within the foundation slab.

15. The electrical device facility of claim 13, further comprising a plurality of ground rods positioned into the ground surface at spaced positions surrounding the foundation slab and a conductor surrounding the foundation slab and electrically interconnecting each of the ground rods and being electrically connected to the rebar exposed from the slab.

16. The electrical device facility of claim 13, wherein the electrical devices comprise dial tone equipment.

17. The electrical device facility of claim 13, wherein the electrical devices comprise digital subscriber line equipment.

18. The electrical device facility of claim 13, wherein the power pedestal further comprises a set of circuit breakers.

19. The electrical device facility of claim 13, wherein the power pedestal further comprises alarm circuits interconnected to the incoming electrical power.

20. The electrical device facility of claim 19, wherein the alarm circuits are fused.

\* \* \* \* \*